Oct. 9, 1934.    G. D. PEET    1,976,672
COLOR COMPARATOR
Filed July 19, 1933    2 Sheets-Sheet 1

INVENTOR
BY Gerald D. Peet
Arthur L. Kent
his ATTORNEY

Oct. 9, 1934.  G. D. PEET  1,976,672
COLOR COMPARATOR
Filed July 19, 1933  2 Sheets-Sheet 2

INVENTOR
Gerald D. Peet
BY
Arthur L. Kent
his ATTORNEY

Patented Oct. 9, 1934

1,976,672

UNITED STATES PATENT OFFICE 1,976,672

COLOR COMPARATOR

Gerald D. Peet, Montclair, N. J., assignor to Wallace & Tiernan Products, Inc., Belleville, N. J., a corporation of New Jersey Application July 19, 1933, Serial No. 681,085

5 Claims. (Cl. 88—14)

This invention relates to color comparators for use in testing liquids by comparing the color of the liquid with graduated standards. The object of the invention is to provide an improved small size portable color comparator employing permanent color standards which shall be convenient to use and accurate in results and of strong and durable construction. The invention has been made especially with the idea of providing such a comparator for use in determining, by the so-called ortho-tolidin test, the amount of free chlorin in water; but the invention is adapted for use generally in colorimetric work. To resist attack by chlorin or other corrosive substances the comparator casing is made of chlorin-resistant material.

The invention consists in the features of construction, arrangement and combination of parts hereinafter described and specifically pointed out in the claims. A full understanding of the invention can best be given by a detailed description of a color comparator embodying the various features of the invention in the form now considered best, and such a description will now be given in connection with the accompanying drawings illustrating such a comparator which has been made especially for use in testing the free chlorin content of water. In said drawings:—

Figure 1:
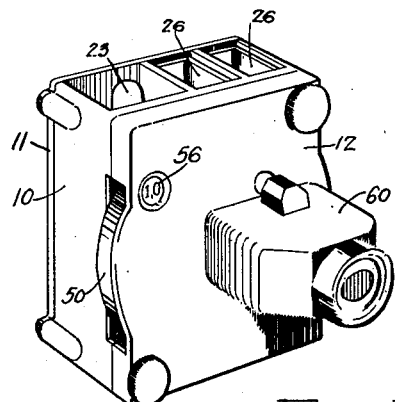
Fig. 1 is a perspective view of the comparator with a detachable prism eyepiece attached.
Figure 2:
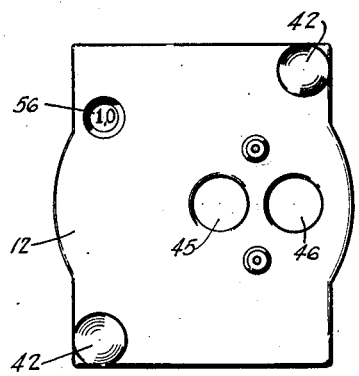
Fig. 2 is a front view of the comparator with the detachable eyepiece removed.
Figure 4:
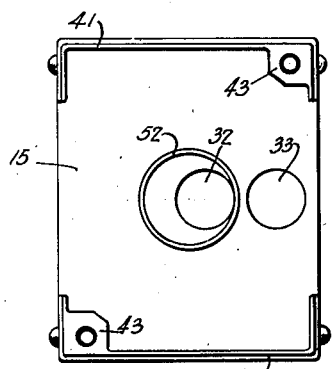
Fig. 4 is a front view with the color disc removed.
Figure 3:
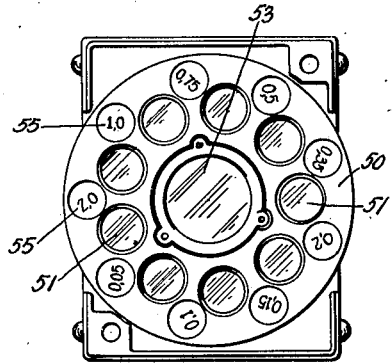
Fig. 3 is a front view with the front cover plate removed.
Figure 5:
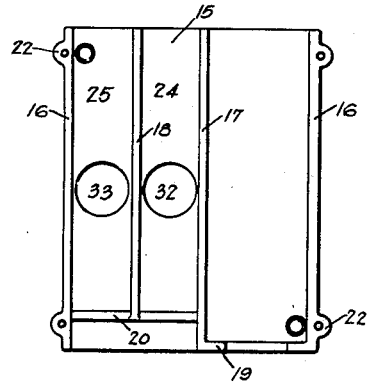
Fig. 5 is a rear view with the back plate removed.

Referring to the drawings, the casing of the device is made up of a casing body part 10, a back plate 11 and a front cover plate 12, which are molded or otherwise formed of suitable light-excluding chlorin-resistant material, preferably a synthetic resin such as bakelite or a suitable bakelite-containing composition.

The casing body part 10 comprises a front wall 15, side walls 16, two vertical partitions 17 and 18, and bottom ledges or stops 19 and 20. The back plate 11 forms the rear wall of the casing and is secured to the side walls 16 by screws extending through lugs 21 near the corners of the back plate and threaded into lugs 22 on the side walls. The space between the front wall 15 and the rear wall 11 is divided by the partition 17 to provide on one side of the partition a vertical compartment for a reagent bottle 23, and the space on the other side of the partition 17 is divided by the partition 18 to form two vertical compartments 24 and 25 for liquid containers or test tubes 26 for holding samples of the water or other liquid to be tested. The several compartments are open at the top of the casing so that the reagent bottle and the test containers may be introduced and removed from the top of the casing. The containers 26 rest on the bottom stop 20 which is of such size as to leave finger openings so that the containers may be pushed up from the bottom. The bottle 23 rests on the bottom stop 19, and this stop also is of such size as to leave a finger opening through which the bottle may be pushed up.

Figure 6:
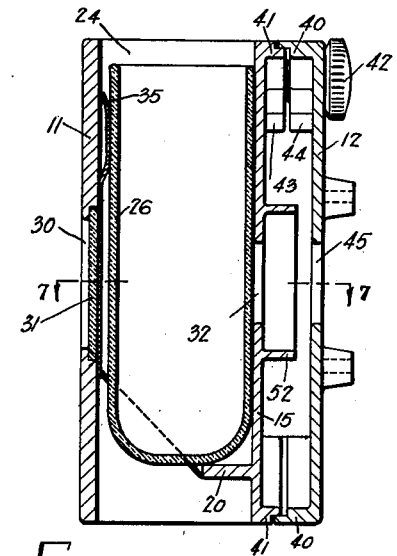
Fig. 6 is a vertical sectional view taken on line 6—6 of Fig. 7 with the color disc removed and without the eyepiece.
Figure 8:
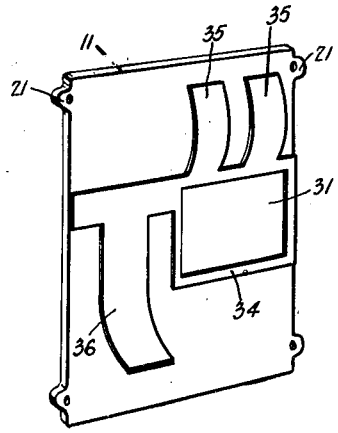
Fig. 8 is a perspective view of the inner side of the back plate.
Figure 7:
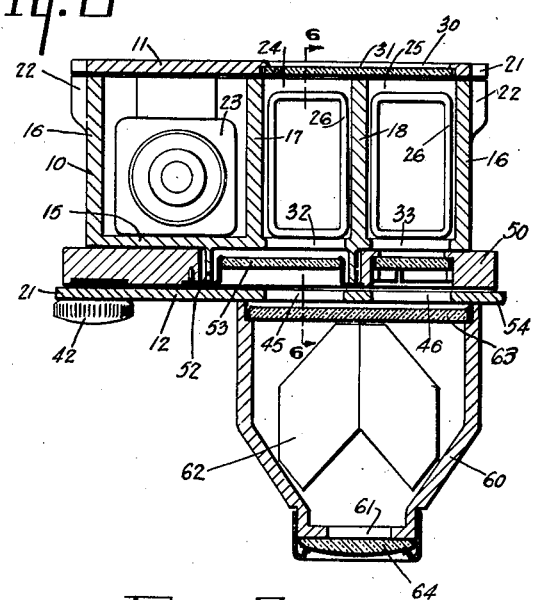
Fig. 7 is a horizontal sectional view taken on line 7—7 of Fig. 6 but with the color disc in place and the eyepiece attached.

For admitting light to illuminate the test containers, the back wall 11 has an opening 30 therein extending across the width of the container compartments 24 and 25, and in order that the light admitted to the containers through this opening shall be suitably diffused, the opening is covered by a pane or plate 31 of milk glass or other suitable light-diffusing translucent material. Horizontally in line with the rear wall opening 30, the front wall 15 has two sight openings 32 and 33 through which the two containers in the compartments 24 and 25 may be viewed against the light-diffusing pane 31. The pane 31 is held in the shouldered opening in the rear wall by a frame 34 of spring sheet material which is cemented or otherwise secured to the rear wall and which has two upwardly extending arms 35 that are deflected or bent flatwise away from the wall so as to serve as spring arms to engage the two containers 26 and frictionally hold them in their compartments positioned against the front wall 15 as shown in Figs. 6 and 7. The frame 34 also has a horizontal extension from which a part 36 extends downward and is deflected from the wall to serve as a spring arm for frictionally holding the reagent bottle in position in its compartment.

The front cover plate 12 is formed with a flange 40, the edge of which is shouldered to match the shouldered edge of a flange 41 formed on the body part 10, and the plate 12 is detachably secured to the body part 10 by two finger screws 42 at diagonally opposite corners of the plate which extend into threaded openings in the body piece, the body piece being strengthened at these points by corner lugs 43 and the cover plate having corresponding lugs 44, one of which is shown in Fig. 6. The cover plate has two sight openings 45 and 46 in horizontal alignment with the sight openings 32 and 33. In the flat compartment between the front plate 15 of the body part and the cover plate 12 there is rotatably mounted a disc 50 which is provided with a circumferential series of graduated permanent color standards 51 of glass which by rotation of the disc may be positioned one at a time in alignment with the sight openings 33 and 46. The disc 50 is formed with a central opening and is mounted on a central annular flange 52 extending from the face of the wall 15. The flange 52 extends about the sight opening 32 so that the view of the container in the compartment 24 through the sight openings 32 and 45 is not obstructed. It is customary in the use of graduated color standards for matching the color of a liquid being tested to provide a compensating glass or other transparent plate through which the colored liquid is viewed. The disc 50 as shown is provided with such a compensating glass 53 mounted in its central opening and thus positioned between the sight openings 32 and 45.

In the device illustrated, the diameter of the color disc is somewhat greater than the width of the body part of the casing. The flange 40 of the cover plate and the flange 41 of the body part of the casing are therefore cut away at the sides as shown so as to permit the disc to project beyond the body of the casing at each side, and the cover plate 12 is formed with outwardly curved side edge portions 54 which extend in front of the projecting portions of the disc. The edge of the disc is thus readily accessible at each side of the device for turning the disc as desired. The color disc carries on its front face a series of figures or other indicating markings 55, each bearing a definite relation to one of the color standards 51, and the cover plate 12 is provided with a third sight opening 56 through which these indications on the color disc may be viewed.

In using the device for determining the amount of free chlorin in water, the two containers or test tubes 26 are filled to a level which when they are positioned in the compartments 24 and 25 will be above the sight openings with samples of the water to be tested, and the amount of water filled into the tube which is to be placed in the inner compartment 24 should be a carefully measured predetermined amount. A predetermined amount of ortho-tolidin reagent is then added to the measured amount of water in the tube which is to be placed in the inner compartment 24, and the reagent and water are thoroughly mixed and the tube is placed in the compartment. Then after waiting sufficient time for the sample to which the reagent has been added to develop its maximum color, usually from 1 to 2 minutes, or more in cold weather, and the other tube containing a sample of the water to which the reagent has not been added having been placed in the outer compartment 25, the color developed in the tube in the inner compartment is compared with the color standards, starting with the lighter color standards and turning the disc to bring the darker color standards into line with the sight openings 46 and 33 and the tube containing the untreated sample until the standard is found which matches or most nearly matches the color of the treated sample. When a disc is found which matches the treated sample, the figure appearing in the sight opening 56 will indicate the residual chlorin in the sample in parts per million. If the color of the sample is found to lie between two color standards, the value of the residual or free chlorin in the sample may be estimated.

The test containers 26 must have transparent front and rear walls and will, in practice, usually be made entirely of clear, colorless, transparent glass. They are most desirably rectangular in cross-section and should be of equal depth horizontally in the direction in which they are viewed through the sight opening.

In order to bring the two color fields as viewed through the sight openings into juxtaposition and thereby secure a more accurate comparison, an eyepiece 60 may be provided adapted to be detachably secured to the front of the cover plate 12 and having a single sight opening 61 and a double prism 62 arranged so that by looking through the sight opening 61 the two sight openings 45 and 46 and the test containers in line therewith will appear as a single disc or field, of which each occupies one-half. The use of this eyepiece facilitates quick and accurate comparison of the treated sample and the color standards. For protection of the prism, the eyepiece is closed at its inner end by a glass plate 63 and at its outer end at the sight opening 61 by a glass 64 which may desirably be a slightly magnifying lens as shown.

As stated, color comparators according to the invention are adapted for uses other than the testing of water for free chlorin content, and it will be understood that for different uses different color discs carrying different color standards and having different indications thereon will be required. Substitution of such different discs is readily made by merely unscrewing the finger screws 42 and removing the cover plate 12.

What is claimed is:

1. A color comparator, comprising a casing of light-excluding corrosion-resistant material having a partition between its front and back walls to provide a front color disc compartment and having the space between said partition and the back wall divided by a partition between the side walls to provide on one side thereof a vertical compartment for a reagent holding bottle, the space on the other side of the last said partition being partitioned to provide two vertical compartments, two containers having transparent front and back walls positioned side by side in said two compartments, said container compartments being open at the top and having finger openings at the bottom the front wall of the casing and the first said partition having sight openings through which said two containers may be viewed, the back wall of the casing having a container-lighting opening covered with white translucent light-diffusing material, and a color disc rotatably mounted in said front compartment provided with a circumferential series of graduated color standards adapted to be positioned by rotation of the disc in alignment with the sight openings through which one of said openings is viewed and having a central sight opening in line with the first said sight openings through which the other container is viewed, said two containers being of equal depth horizontally in the direction in which they are viewed through the sight openings.

2. A color comparator, comprising a casing of light-excluding corrosion-resistant material consisting of a body part having front and side walls and vertical partitions extending from the front wall between the side walls, a rear wall secured to the side walls of the body part, and a detachable flanged front cover plate forming with the front wall of the body part a color-disc compartment, said partitions dividing the space between the front wall of the body part and the rear wall into two vertical container compartments and a third compartment, said compartments being open at the top and having finger openings at the bottom; two containers having transparent front and rear walls positioned side by side within said two container compartments, the front wall of said body part and the cover plate having sight openings through which said two containers may be viewed, the rear wall of the casing having a container-lighting opening covered with white translucent light-diffusing material, and a color disc rotatably mounted in said color-disc compartment provided with a circumferential series of graduated color standards adapted to be positioned by rotation of the disc in alignment with the sight openings through which one of said containers is viewed, the two containers being of equal depth horizontally in the direction in which they are viewed through the sight openings.

3. A color comparator, comprising a casing of light-excluding corrosion-resistant material consisting of a body part having front and side walls and vertical partitions extending from the front wall between the side walls, a rear wall secured to the side walls of the body part, and a detachable flanged front cover plate forming with the front wall of the body part a color-disc compartment, said partitions dividing the space between the front wall of the body part and the rear wall into two vertical container compartments and a third compartment, said compartments being open at the top and having finger openings at the bottom; two containers having transparent front and rear walls positioned side by side within said two container compartments, the front wall of said body part and the cover plate having sight openings through which said two containers may be viewed, the rear wall of the casing having an opening back of said containers, a plate of translucent light-diffusing material covering said opening in the rear wall, a frame of spring sheet material secured to the inner side of the rear wall to hold said plate in position and having parts extending therefrom and deflected flatwise to serve as positioning springs for holding said containers in position against the front wall of the body part, and a color disc rotatably mounted in said color-disc compartment provided with a circumferential series of graduated color standards adapted to be positioned by rotation of the disc in alignment with the sight openings through which one of said containers is viewed, the two containers being of equal depth horizontally in the direction in which they are viewed through the sight openings.

4. A color comparator, comprising a casing of light-excluding material having two vertical compartments for containers for liquid to be tested and a bottle compartment, said compartments being open at the top, the front wall of the casing having two sight openings through which containers positioned in said container compartments may be viewed, a movable member mounted in the front part of the casing provided with a series of graduated color standards adapted to be positioned by movement of said member in alignment with one of said sight openings, the rear wall of the casing having an opening back of said container compartments, a plate of translucent light-diffusing material covering said opening in the rear wall, and a plate of spring sheet material secured to the inner side of the rear wall having a frame portion to hold said translucent plate in position and having vertically extending portions deflected flatwise to serve as positioning springs for holding the containers in position against the front wall of the container compartments and having a horizontally extending portion from which extends a part deflected flatwise to serve as a retaining spring for frictionally holding a bottle in the bottle compartment.

5. A color comparator, comprising a casing of light-excluding material adapted to hold a plurality of containers standing vertically and removable through the top of the casing, the front wall of the casing having two sight openings, the rear wall of the casing having a lighting opening, a plate of translucent light-diffusing material covering said lighting opening, a plate of spring sheet material secured to the inner side of the rear wall shaped to provide a holding frame for said translucent plate and flatwise deflected spring arms, means cooperating with said spring arms for positioning two containers for liquid to be tested between the translucent plate and the sight openings, and a color standard disc rotatably mounted in the front part of the casing.

GERALD D. PEET.